United States Patent
Peng (10) Patent No.: US 11,231,117 B1
(45) Date of Patent: Jan. 25, 2022

(54) WATER CONTROL VALVE

(71) Applicant: KUCHING INTERNATIONAL LTD., Taichung (TW)

(72) Inventor: Hao-Nan Peng, Taichung (TW)

( * ) Notice: Subject to any disclaimer, the term of this patent is extended or adjusted under 35 U.S.C. 154(b) by 0 days.

(21) Appl. No.: 17/029,384

(22) Filed: Sep. 23, 2020

(51) Int. Cl.
*F16K 11/078* (2006.01)
*F16K 31/52* (2006.01)
*F16K 27/04* (2006.01)

(52) U.S. Cl.
CPC ........ *F16K 11/0785* (2013.01); *F16K 27/044* (2013.01); *F16K 31/523* (2013.01); *Y10T 137/86815* (2015.04); *Y10T 137/8708* (2015.04); *Y10T 137/87571* (2015.04)

(58) Field of Classification Search
CPC ........... F16K 11/0785; F16K 11/07087; F16K 11/0782; F16K 31/523; F16K 31/605; F16K 31/52475; F16K 3/08; F16K 3/26; F16K 27/044; Y10T 137/86823; Y10T 137/9464; Y10T 137/87571; Y10T 137/86718; Y10T 137/87088; Y10T 137/8708; Y10T 137/86815; Y10T 137/87056; Y10T 137/87587–87668; E03C 1/2306; E03C 2201/30
USPC .................................................. 236/12.1–13
See application file for complete search history.

(56) References Cited

U.S. PATENT DOCUMENTS

| | | | | |
|---|---|---|---|---|
| 5,417,242 A * | 5/1995 | Goncze | ............... | F16K 11/0787 137/625.17 |
| 5,538,041 A * | 7/1996 | G anzle | ............... | F16K 11/0787 137/625.17 |
| 5,857,489 A * | 1/1999 | Chang | .................. | F16K 11/0787 137/625.17 |
| 6,966,335 B2 * | 11/2005 | Chen | .................... | F16K 11/0782 137/625.17 |
| 7,063,106 B2 * | 6/2006 | Knapp | ................ | F16K 11/0787 137/625.17 |
| 7,357,154 B1 * | 4/2008 | Chen | .................... | F16K 11/0787 137/625.17 |
| 7,891,638 B2 * | 2/2011 | Chen | ..................... | F16K 31/602 251/238 |
| 8,646,750 B1 * | 2/2014 | Chen | ................... | F16K 11/0782 251/160 |
| 9,091,357 B2 * | 7/2015 | Chen | ................... | F16K 11/0782 |
| 9,228,675 B2 * | 1/2016 | Chen | ..................... | F16K 27/044 |
| 9,267,612 B2 * | 2/2016 | Chen | .................. | F16K 11/0787 |
| 9,411,358 B2 * | 8/2016 | Ben-Dor | ............... | F16K 31/605 |

(Continued)

*Primary Examiner* — Craig J Price
*Assistant Examiner* — Andrew J Rost
(74) *Attorney, Agent, or Firm* — Egbert, McDaniel & Swartz, PLLC (57) ABSTRACT

A water control valve has a valve casing, a valve seat, a fixed valve plate, a movable valve plate, a driving piece, a press structure and a pulling structure, wherein the valve seat is assembled on one end of the valve casing. The fixed valve plate, movable valve plate and driving piece are disposed in the valve casing. A flow channel for the fluid is formed among the valve seat, the fixed valve plate and the movable valve plate. The driving piece is in contact with the movable valve plate. The pulling structure has a first shaft lever and a swing piece. The press structure pulls the first shaft lever the move axially. The first shaft lever pulls the swing piece to rotate, so that the driving piece drives the movable valve plate to slide laterally, the handiness of flow control or the on/off of the flow channel is enhanced.

11 Claims, 5 Drawing Sheets

(56) References Cited

U.S. PATENT DOCUMENTS

| | | | | |
|---|---|---|---|---|
| 9,464,417 B2* | 10/2016 | Chen | ................... | F16K 11/0787 |
| 9,677,254 B2* | 6/2017 | Prabhakar | ............. | F16K 31/524 |
| 10,036,146 B2* | 7/2018 | Ben-Dor | ................... | G05G 1/04 |
| 2004/0069358 A1* | 4/2004 | Knapp | ................... | F16K 25/005 |
| | | | | 137/625.17 |

* cited by examiner

WATER CONTROL VALVE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a piping installation for controlling fluid, and more particularly to a water control valve.

2. Description of Related Art Including Information Disclosed Under 37 CFR 1.97 and 37 CFR 1.98

The known pull-type water control valve comprises a valve casing, a valve handle, a driving seat, a movable valve plate, a fixed valve plate and a valve seat. Wherein the driving seat, the movable valve plate and the fixed valve plate are assembled in the valve casing. The movable valve plate and the fixed valve plate are made of ceramics. The movable valve plate and the fixed valve plate overlap each other. The driving seat is in contact with the movable valve plate. The valve seat is assembled on one end of the valve casing. The fixed valve plate is in contact with the valve seat. One end of the valve handle is in contact with the driving seat. The other end of the valve handle protrudes out of the valve casing.

The valve handle is pulled laterally, the valve handle pulls the driving seat to slide laterally, so that the movable valve plate slides laterally, changing the flow of water through the water control valve or controlling the water to or not to flow through the water control valve.

The conventional press-type water control valve pulls a valve handle to move back and forth with a press structure, so as to change the internal flow path on/off of the water control valve to control the water to or not to flow through the water control valve.

BRIEF SUMMARY OF THE INVENTION

The fundamental purpose of the present invention is to provide a water control valve, which can enhance the handiness and can control the flow or on/off.

In the present invention is a water control valve which comprises a valve casing, a valve seat, a fixed valve plate, a movable valve plate, a driving piece, a press structure and a pulling structure, wherein the valve seat is assembled on one end of the valve casing. The fixed valve plate, the movable valve plate and the driving piece are disposed in the valve casing. The fixed valve plate is in watertight contact with the valve seat. The movable valve plate and the fixed valve plate overlap each other. A flow channel for the fluid is formed among the valve seat, the fixed valve plate and the movable valve plate. The driving piece is in contact with the movable valve plate, so that the driving piece drives the movable valve plate to slide laterally to regulate the flow of the fluid through the flow channel or the on/off of the flow channel A joint holder is disposed in the valve casing, and the joint holder is provided with a through groove, one end of the through groove is oriented to the driving piece. One end of the joint holder is adjacent to the driving piece; the other end of the joint holder is provided with a shelly supporter. One end of the supporter far from the joint holder is provided with a support plate.

The press structure comprises a positioning element, a press cap and a follower, wherein the positioning element is in contact with the support plate, so as to position the press structure. The positioning element is provided with a positioning structure. The press cap is pivoted on the positioning element. The follower is axially opposite to the press cap, so that the press cap presses the follower to move axially, the follower is located in a first position or a second position by the positioning structure. the pulling structure comprises a first shaft lever, a connecting rod, a swing piece, a pivot and a spring, wherein the first shaft lever penetrates the support plate, and one end of the first shaft lever is in contact with the follower, the other end of the first shaft lever is located in the supporter, the first shaft lever is axially put in the spring, both ends of the spring prop the support plate and the follower respectively; the connecting rod is laterally opposite to the first shaft lever; a first hinge arm laterally protrudes from the first shaft lever, the first hinge arm is laterally pivoted on the connecting rod. The swing piece is provided with a second shaft lever and a drawing part. One end of the second shaft lever is laterally opposite to the connecting rod. A second hinge arm laterally protrudes from the second shaft lever. The second hinge arm is laterally pivoted on the connecting rod, and the first hinge arm is located between the second hinge arm and the support plate. The pivot laterally penetrates the swing piece, and the first hinge arm, the second hinge arm and the pivot are parallel. The swing piece is held in the through groove; both ends of the pivot are pivoted on the joint holder respectively.

The axis of the first shaft lever is orthogonally projected on the connecting rod to form a virtual first line, a virtual second line is connected to the axes of the first hinge arm and the second hinge arm. The second line is orthogonal to the first hinge arm and the second hinge arm respectively. The first line obliquely contacts the second line. The driving piece forms an insert hole. The drawing part is pivoted in the insert hole, hereby, the follower pulls the first shaft lever to move back and forth. The swing piece rotates round the pivot; the drawing part draws the driving piece to drive the movable valve plate to slide laterally, so as to enhance the handiness of flow control or on/off of the flow channel.

In the present invention, the press cap is pressed, so that the movable valve plate slides laterally against the fixed valve plate to regulate the flow of the fluid through the flow channel or the on/off of the flow channel.

DETAILED DESCRIPTION OF THE INVENTION

As shown in FIG. 1 to FIG. 5, the preferred embodiment of the present invention includes a valve casing 10, a valve seat 22, a fixed valve plate 24, a movable valve plate 26, a driving piece 30, a press structure 40 and a pulling structure 50. Wherein the valve seat 22 is assembled on one end of the valve casing 10. The fixed valve plate 24, the movable valve plate 26 and the driving piece 30 are disposed in the valve casing 10. The fixed valve plate 24 is in watertight contact with the valve seat 22 through a leak stop element 23. The movable valve plate 26 and the fixed valve plate 24 overlap each other, a flow channel 28 for the fluid (not shown in the figure) is formed among the valve seat 22, the fixed valve plate 24 and the movable valve plate 26. The driving piece 30 is in contact with the movable valve plate 26, so that the driving piece 30 drives the movable valve plate 26 to slide laterally to regulate the flow of the fluid through the flow channel 28 or the on/off of the flow channel 28. The specific construction of the flow channel 28 shown in the figures is only one example, not to limit the explanation of the present invention, in different constructions of the flow channel 28, the flow can be changed, the flow channel 28 can be opened or closed, or the mixing ratio of fluids with different properties (e.g. temperature) can be changed when the movable valve plate 26 is actuated. The persons of related technical fields can change the construction of the flow channel 28 according to the application target of water control valve.

A joint holder 60 is disposed in the valve casing 10, the joint holder 60 is provided with a through groove 62, one end of the through groove 62 is oriented to the driving piece 30. One end of the joint holder 60 is adjacent to the driving piece 30. The other end of the joint holder 60 is provided with a shelly supporter 70. One end of the supporter 70 far from the joint holder 60 is provided with a support plate 80.

Figure 1:
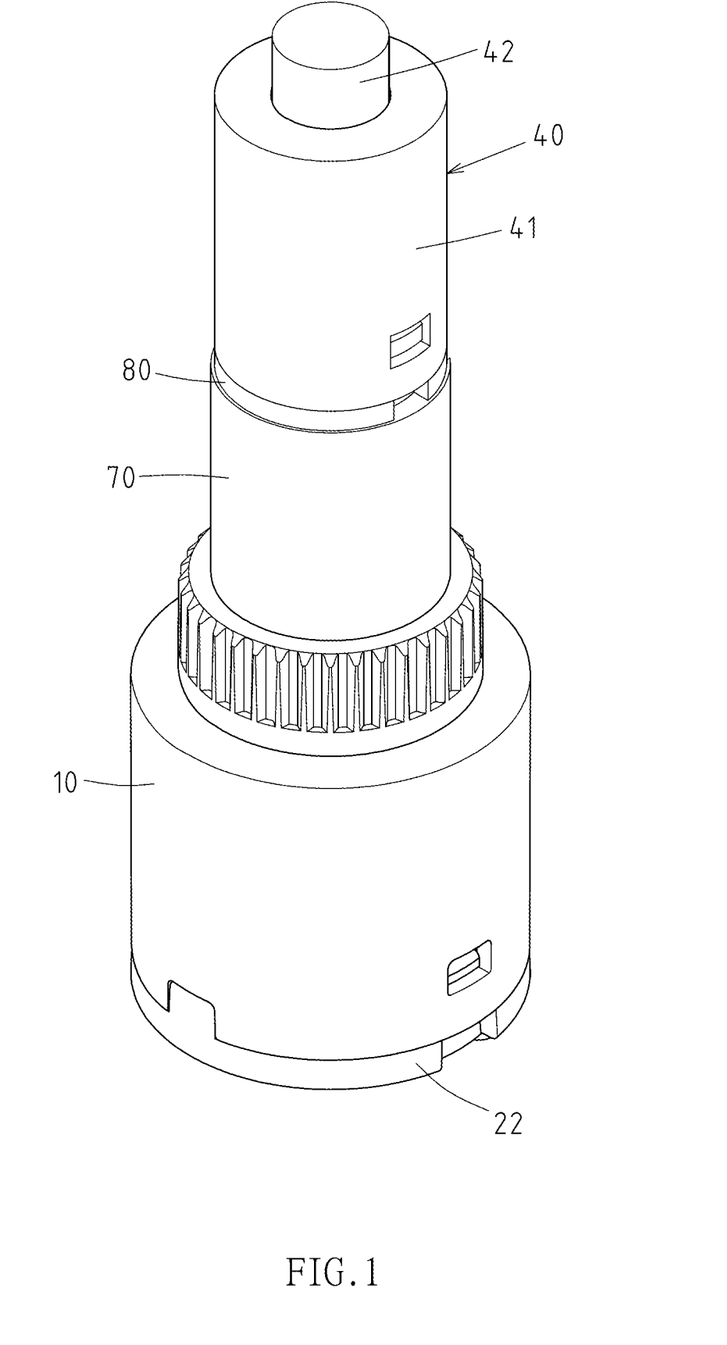
FIG. 1 is a perspective view of the preferred embodiment of the present invention.
Figure 2:
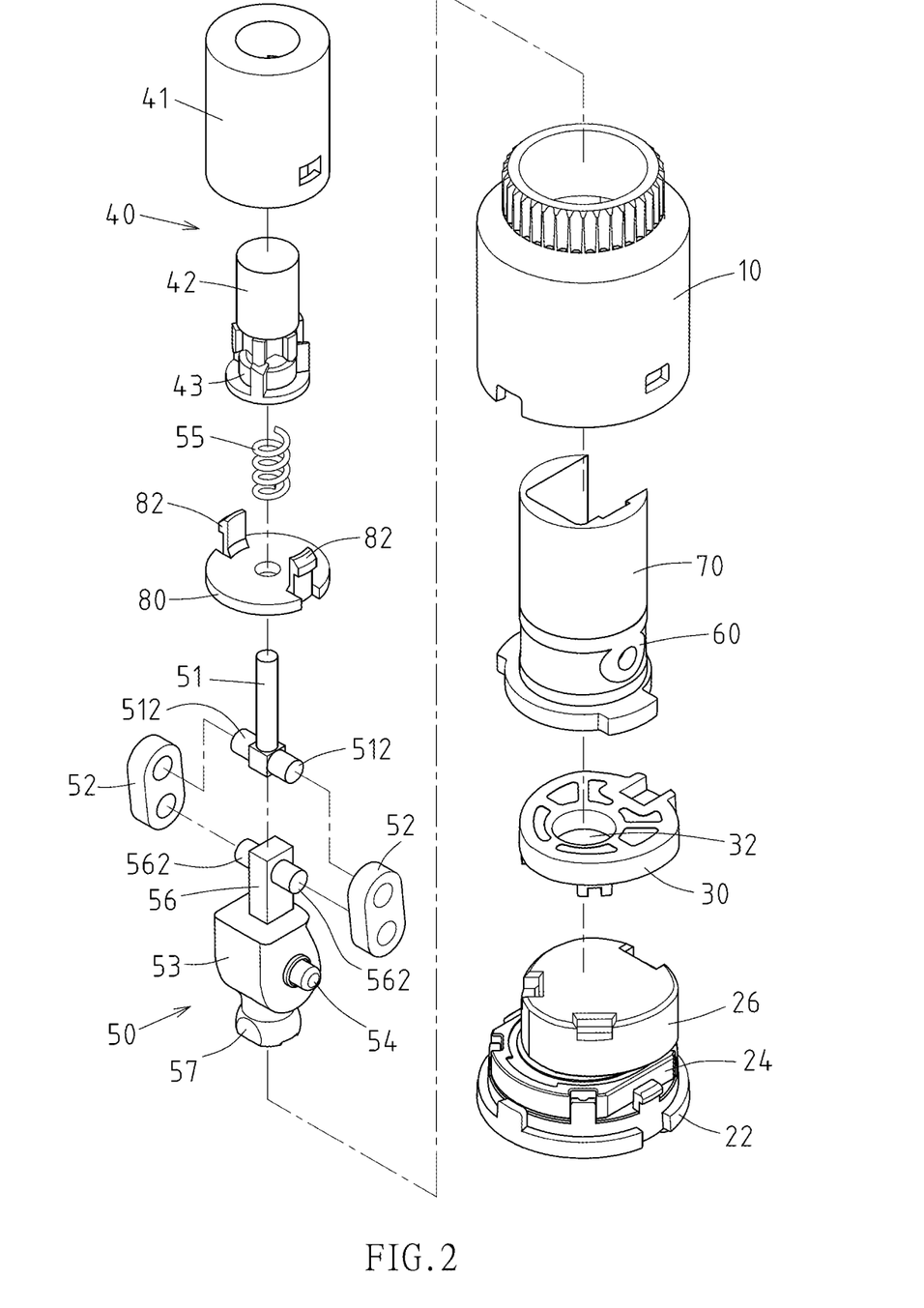
FIG. 2 is a three-dimensional exploded view of the preferred embodiment of the present invention.
Figure 3:
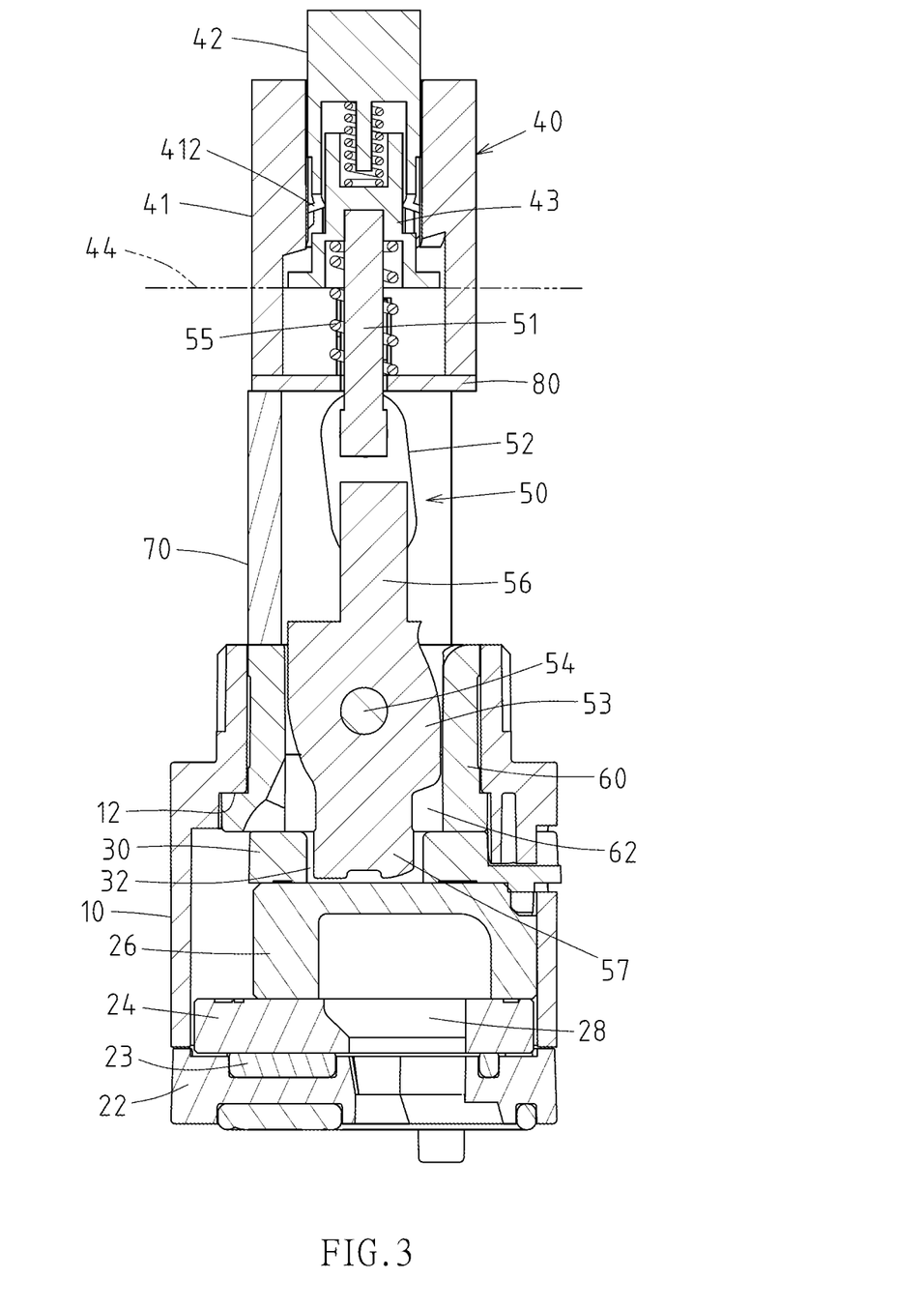
FIG. 3 is a sectional view of the preferred embodiment of the present invention.
Figure 5:
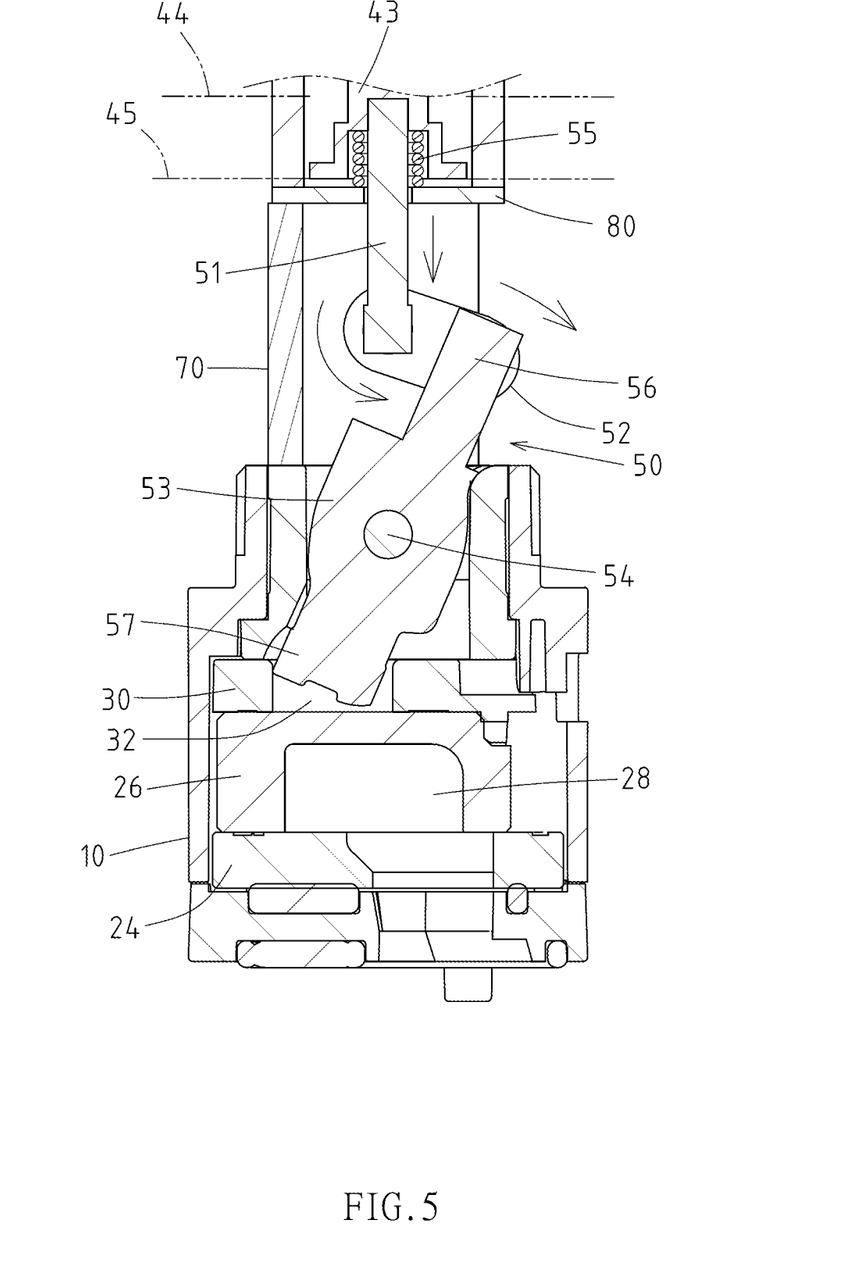
FIG. 5 is a partial sectional view of actuating state in the preferred embodiment of the present invention.

The press structure 40 comprises a positioning element 41, a press cap 42 and a follower 43. The positioning element 41 is in contact with the support plate 80, so as to position the press structure 40. The positioning element 41 is provided with a positioning structure 412. The press cap 42 is pivoted on the positioning element 41. The follower 43 is axially opposite to the press cap 42, so that the press cap 42 presses the follower 43 to move axially, as shown in FIG. 3 and FIG. 5, the follower 43 is located in a first position 44 or a second position 45 by the positioning structure 412. The press structure 40 is often seen in the press-type water control valve, it is the existing technology the persons of the same domain are familiar to, the specific construction of the press structure 40 will not be described in detail.

The pulling structure 50 comprises a first shaft lever 51, two connecting rods 52, a swing piece 53, a pivot 54 and a spring 55. Wherein the first shaft lever 51 penetrates the support plate 80, and one end of the first shaft lever 51 is in contact with the follower 43, the other end of the first shaft lever 51 is located in the supporter 70. The first shaft lever 51 is axially put in the spring 55. Both ends of the spring 55 prop the support plate 80 and the follower 43 respectively. The swing piece 53 is provided with a second shaft lever 56 and a drawing part 57. The connecting rods 52 are opposite to both sides of the first shaft lever 51 and the second shaft lever 56 respectively. Two first hinge arms 512 laterally protrude from the first shaft lever 51. The first hinge arms 512 are laterally pivoted on the connecting rods 52 respectively. Two second hinge arms 562 laterally protrude from the second shaft lever 56, the second hinge arms 562 are laterally pivoted on the connecting rods 52 respectively, and the first hinge arm 512 is located between the second hinge arm 562 and the support plate 80. The pivot 54 laterally penetrates the swing piece 53, and the first hinge arm 512, the second hinge arm 562 and the pivot 54 are parallel. The swing piece 53 is stored in the through groove 62, both ends of the pivot 54 are pivoted on the joint holder 60 respectively.

Figure 4:
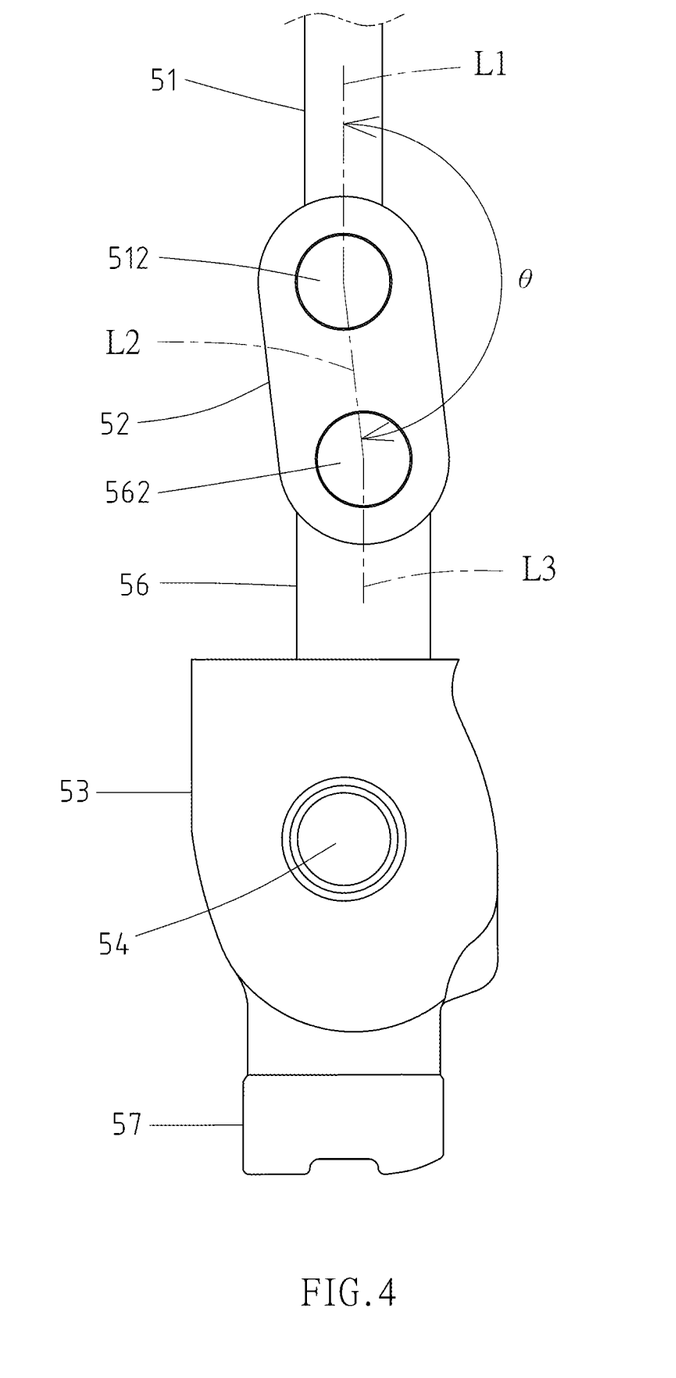
FIG. 4 is a side view of the first shaft lever, connecting rod and the second shaft lever in the preferred embodiment of the present invention.

As shown in FIG. 4, the axis of the first shaft lever 51 is orthogonally projected on the connecting rod 52 to form a virtual first line L1, a virtual second line L2 is connected to the axes of the first hinge arm 512 and the second hinge arm 562. The second line L2 is orthogonal to the first hinge arm 512 and the second hinge arm 562 respectively. The first line L1 obliquely contacts the second line L2. The driving piece 30 forms an insert hole 32. The drawing part 57 is pivoted in the insert hole 32, hereby, the follower 43 pulls the first shaft lever 51 to move back and forth. The swing piece 53 rotates round the pivot 54. The drawing part 57 draws the driving piece 30 to drive the movable valve plate 26 to slide laterally, so as to enhance the handiness of flow control or on/off of the flow channel 28.

When the press cap 42 is pressed, the follower 43 moves from the first position 44 to the second position 45, so that the first shaft lever 51 is actuated toward the swing piece 53. The connecting rod 52 rotates in counterclockwise direction of the figure round the first hinge arm 512. The swing piece 53 rotates in clockwise direction of the figure round the pivot 54. The drawing part 57 pulls the driving piece 30 to slide to the left of figure. The movable valve plate 26 is driven by the driving piece 30 to slide to the left of the figure, so as to change the flow channel 28, and to regulate the flow of the fluid through the flow channel 28 or the on/off of the flow channel 28.

When the press cap 42 is pressed again, the spring 55 provides an elastic force, the follower 43 is actuated from the second position 45 to the first position 44, the first shaft lever 51 is actuated away from the swing piece 53, the swing piece 53 and the driving piece 30 turn from the state in FIG. 5 into the state in FIG. 3, so as to change the flow channel 28.

An included angle θ is formed between the first line L1 and the second line L2. The included angle θ larger than 90° and smaller than 180° is a better implementation. The axis of the second shaft lever 56 is orthogonally projected on the connecting rod 52 to form a virtual third line L3. The first line L1 is parallel with the third line L3. The valve casing 10 has a ring surface 12, the ring surface 12 is located between both ends of the valve casing 10. The ring surface 12 limits the joint holder 60, so as to position the joint holder 60. One side of the supporter 70 is open to the outside as required, so as to avoid the supporter 70 confining the actuation of the connecting rod 52 and the second shaft lever 56. The support plate 80 has two hooking parts 82, the hooking parts 82 are hooked with the positioning element 41 respectively, so that the support plate 80 is in contact with the positioning element 41.

The preferred embodiment can be changed to a second embodiment, the different construction of the second embodiment is that the quantity of the connecting rods 52 is changed to one, the connecting rod 52 is laterally opposite to the first shaft lever 51, one end of the second shaft lever 56 is laterally opposite to the connecting rod 52, the quantity of the first hinge arms 512 and the second hinge arms 562 is changed to one respectively to match the connecting rod 52. In the second embodiment, the driving piece 30 can be pulled to slide laterally by pressing the press cap 42. The preferred embodiment has higher reliability of the first shaft lever 51 pulling the second shaft lever 56 through the connecting rods 52 than the second embodiment.

The preferred embodiment can be changed to a third embodiment, the different construction of the third embodiment is that the support plate 80 is linked with the supporter 70, the supporter 70 is linked with the joint holder 60, when the positioning element 41 is rotated, the positioning element 41 drives the swing piece 53 to rotate through the support plate 80, the supporter 70 and the joint holder 60, with the opposite arrangement of the drawing part 57 and the insert hole 32 in shape and spatial position, the swing piece 53 can drive the driving piece 30 to rotate through the drawing part 57, so that the movable valve plate 26 rotates against the fixed valve plate 24, the flow of the fluid through the flow channel 28 is regulated or the on/off of the flow channel 28 is controlled by rotating the positioning element 41.

The first shaft lever 51 and the follower 43 in the preferred embodiment can be integrated in one, so as to form a fourth embodiment.

I claim:

1. A water control valve, comprising a valve casing, a valve seat, a fixed valve plate, a movable valve plate, a driving piece, a press structure and a pulling structure, wherein the valve seat is assembled on one end of the valve casing; the fixed valve plate, the movable valve plate and the driving piece are disposed in the valve casing; the fixed valve plate is in watertight contact with the valve seat; the movable valve plate and the fixed valve plate overlap each other; a flow channel for the fluid is formed among the valve seat, the fixed valve plate and the movable valve plate; the driving piece is in contact with the movable valve plate, so that the driving piece drives the movable valve plate to slide laterally to regulate the flow of the fluid through the flow channel or the on/off of the flow channel;

a joint holder is disposed in the valve casing, the joint holder is provided with a through groove, one end of the through groove is oriented to the driving piece; one end of the joint holder is adjacent to the driving piece; the other end of the joint holder is provided with a shelly supporter; one end of the supporter far from the joint holder is provided with a support plate;

the press structure comprises a positioning element, a press cap and a follower, wherein the positioning element is in contact with the support plate, so as to position the press structure; the positioning element is provided with a positioning structure; the press cap is pivoted on the positioning element; the follower is axially opposite to the press cap, so that the press cap presses the follower to move axially, the follower is located in a first position or a second position by the positioning structure;

the pulling structure comprises a first shaft lever, a connecting rod, a swing piece, a pivot and a spring, wherein the first shaft lever penetrates the support plate, and one end of the first shaft lever is in contact with the follower, the other end of the first shaft lever is located in the supporter, the first shaft lever is axially put in the spring, both ends of the spring prop the support plate and the follower respectively; the connecting rod is laterally opposite to the first shaft lever; a first hinge arm laterally protrudes from the first shaft lever, the first hinge arm is laterally pivoted on the connecting rod; the swing piece is provided with a second shaft lever and a drawing part; one end of the second shaft lever is laterally opposite to the connecting rod; a second hinge arm laterally protrudes from the second shaft lever; the second hinge arm is laterally pivoted on the connecting rod, and the first hinge arm is located between the second hinge arm and the support plate; the pivot laterally penetrates the swing piece, and the first hinge arm, the second hinge arm and the pivot are parallel; the swing piece is held in the through groove; both ends of the pivot are pivoted on the joint holder respectively;

the axis of the first shaft lever is orthogonally projected on the connecting rod to form a virtual first line, a virtual second line is connected to the axes of the first hinge arm and the second hinge arm; the second line is orthogonal to the first hinge arm and the second hinge arm respectively; the first line obliquely contacts the second line; the driving piece forms an insert hole; the drawing part is pivoted in the insert hole, hereby, the follower pulls the first shaft lever to move back and forth; the swing piece rotates round the pivot; the drawing part draws the driving piece to drive the movable valve plate to slide laterally, so as to enhance the handiness of flow control or on/off of the flow channel.

2. The water control valve defined in claim 1, wherein an included angle θ is formed between the first line and the second line, the included angle θ is larger than 90° and smaller than 180°.

3. The water control valve defined in claim 2, wherein the pulling structure has two connecting rods, the connecting rods are laterally opposite to each other, and the connecting rods are opposite to both sides of the first shaft lever and the second shaft lever respectively; two first hinge arms laterally protrude from the first shaft lever, the first hinge arms are laterally pivoted on the connecting rods respectively; two second hinge arms laterally protrude from the second shaft lever, the second hinge arms are laterally pivoted on the connecting rods respectively, so as to enhance the reliability of the first shaft lever pulling the second shaft lever through the connecting rods.

4. The water control valve defined in claim 1, wherein the axis of the second shaft lever is orthogonally projected on the connecting rod to form a virtual third line, the first line is parallel with the third line.

5. The water control valve defined in claim 4, wherein the pulling structure comprises two connecting rods, the connecting rods are laterally opposite to each other, and the connecting rods are opposite to both sides of the first shaft lever and the second shaft lever respectively; two first hinge arms laterally protrude from the first shaft lever, the first hinge arms are laterally pivoted on the connecting rods respectively; two second hinge arms laterally protrude from the second shaft lever, the second hinge arms are laterally pivoted on the connecting rods respectively, so as to enhance the reliability of the first shaft lever pulling the second shaft lever through the connecting rods.

6. The water control valve defined in claim 1, wherein the valve casing has a ring surface, the ring surface is located between both ends of the valve casing, the ring surface limits the joint holder, so as to position the joint holder.

7. The water control valve defined in claim 1, wherein the pulling structure has two connecting rods, the connecting rods are laterally opposite to each other, and the connecting rods are opposite to both sides of the first shaft lever and the second shaft lever respectively; two first hinge arms laterally protrude from the first shaft lever, the first hinge arms are laterally pivoted on the connecting rods respectively; two second hinge arms laterally protrude from the second shaft lever, the second hinge arms are laterally pivoted on the connecting rods respectively, so as to enhance the reliability of the first shaft lever pulling the second shaft lever through the connecting rods.

8. The water control valve defined in claim 1, wherein the support plate is linked with the supporter, the supporter is linked with the joint holder, so that the positioning element drives the driving piece to rotate.

9. The water control valve defined in claim 1, one side of the supporter is open to the outside.

10. The water control valve defined in claim 1, wherein the first shaft lever and the follower are integrated in one.

11. The water control valve defined in claim 1, wherein the support plate has two hooking parts, the hooking parts are hooked with the positioning element respectively.

* * * * *